US012592421B2

(12) United States Patent (10) Patent No.: US 12,592,421 B2
Park et al. (45) Date of Patent: Mar. 31, 2026

(54) BATTERY PACK, ELECTRONIC DEVICE AND VEHICLE

(71) Applicant: LG ENERGY SOLUTION, LTD., Seoul (KR)

(72) Inventors: Chang-Wook Park, Daejeon (KR); Hyun-Jong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 641 days.

(21) Appl. No.: 18/008,383

(22) PCT Filed: Sep. 15, 2021

(86) PCT No.: PCT/KR2021/012643
§ 371 (c)(1),
(2) Date: Dec. 5, 2022

(87) PCT Pub. No.: WO2022/085954
PCT Pub. Date: Apr. 28, 2022

(65) Prior Publication Data
US 2023/0282899 A1 Sep. 7, 2023

(30) Foreign Application Priority Data
Oct. 21, 2020 (KR) ........................ 10-2020-0137092

(51) Int. Cl.
*H01M 10/48* (2006.01)
*H01M 50/213* (2021.01)
(52) U.S. Cl.
CPC ....... *H01M 10/486* (2013.01); *H01M 10/482* (2013.01); *H01M 50/213* (2021.01)
(58) Field of Classification Search
CPC ............. H01M 10/482; H01M 10/486; H01M 10/613; H01M 10/625; H01M 50/249; H01M 50/569
See application file for complete search history.

(56) References Cited

U.S. PATENT DOCUMENTS 5,459,388 A 10/1995 Illingworth et al.
2006/0028183 A1 2/2006 Izawa et al.
(Continued)

FOREIGN PATENT DOCUMENTS

JP 2006-35942 A 2/2006
JP 2014-212026 A 11/2014
(Continued)

OTHER PUBLICATIONS

KR-20170027547-A English machine translation (Year: 2017).*
(Continued)

*Primary Examiner* — Scott J. Chmielecki
(74) *Attorney, Agent, or Firm* — Morgan, Lewis & Bockius LLP

(57) ABSTRACT

Disclosed is a battery pack, which includes a plurality of battery cells; a temperature measuring unit configured to measure a temperature of at least one of the plurality of battery cells; a temperature sensor connected to the temperature measuring unit and configured to detect the temperature of at least one of the plurality of battery cells and transmit an electrical signal to the temperature measuring unit; and a module case including a sidewall portion configured to form an inner space for accommodating the plurality of battery cells, an opening formed in the sidewall portion to expose at least one of the plurality of battery cells to the outside partially, an accommodation portion having an entrance communicating with the opening and configured to accommodate an end of the temperature sensor, and a fixing rib configured to extend from the sidewall portion to cover the entrance partially.

11 Claims, 7 Drawing Sheets

(56) References Cited

U.S. PATENT DOCUMENTS

| | | | |
|---|---|---|---|
| 2009/0022206 A1 | 1/2009 | Shibuya et al. | |
| 2012/0121939 A1 | 5/2012 | Yoo | |
| 2014/0065448 A1 | 3/2014 | Ahn et al. | |
| 2014/0227570 A1 * | 8/2014 | Hoshi | H01M 10/486 |
| | | | 429/90 |
| 2015/0079437 A1 | 3/2015 | Jeong et al. | |
| 2016/0233561 A1 | 8/2016 | Lee | |
| 2017/0250395 A1 | 8/2017 | Cheon et al. | |
| 2019/0165434 A1 | 5/2019 | Born et al. | |
| 2020/0365849 A1 * | 11/2020 | Park | H01M 50/211 |
| 2020/0411919 A1 * | 12/2020 | Friedrich | H01M 10/482 |
| 2021/0028514 A1 * | 1/2021 | Park | G01K 1/026 |
| 2021/0044180 A1 * | 2/2021 | Seo | H02K 11/25 |
| 2021/0057692 A1 * | 2/2021 | Kim | H01M 50/244 |
| 2021/0296911 A1 * | 9/2021 | Itakura | B60L 3/0046 |
| 2022/0278386 A1 * | 9/2022 | Cho | H01M 10/6553 |

FOREIGN PATENT DOCUMENTS

| | | | | |
|---|---|---|---|---|
| JP | 2016-18739 A | 2/2016 | | |
| JP | 2017-152163 A | 8/2017 | | |
| JP | 2019-100952 A | 6/2019 | | |
| KR | 10-2001-0004692 A | 1/2001 | | |
| KR | 10-2012-0053458 A | 5/2012 | | |
| KR | 10-2012-0063066 A | 6/2012 | | |
| KR | 10-2014-0032596 A | 3/2014 | | |
| KR | 10-2014-0113861 A | 9/2014 | | |
| KR | 10-2015-0031094 A | 3/2015 | | |
| KR | 10-2017-0027547 A | 3/2017 | | |
| KR | 20170027547 A | * | 3/2017 | H01M 10/637 |
| KR | 10-2017-0101604 A | 9/2017 | | |
| KR | 10-1815152 B1 | 1/2018 | | |
| KR | 10-2018-0094632 A | 8/2018 | | |
| KR | 10-2019-0112468 A | 10/2019 | | |

OTHER PUBLICATIONS

Office Action issued in corresponding Taiwanese Patent Application No. 110138867, dated Feb. 4, 2025. (Note: JP 2016-18739 A, JP 2014-212026 A and KR 10-2017-0027547 A were previously cited).

International Search Report (with partial translation) and Written Opinion dated Jan. 3, 2022, for corresponding International Patent Application No. PCT/KR2021/012643.

Extended European Search Report dated Jan. 20, 2025 issued in corresponding European Patent Application No. 21883026.3.

Office Action issued Oct. 16, 2023 for Japanese Patent Application No. 2022-565682 Note: KR 10-2017-0027547 was cited in a prior IDS.

Office Action issued in corresponding Korean Patent Application No. 10-2021-0123525, dated Sep. 5, 2025. (Note: KR 10-2017-0027547 A was previously cited).

* cited by examiner

BATTERY PACK, ELECTRONIC DEVICE AND VEHICLE

TECHNICAL FIELD

The present disclosure relates to a battery pack, an electronic device, and a vehicle, and more particularly, to a battery pack for securing easy installation of a temperature sensor and enhancing reliability of temperature measurement for a plurality of battery cells.

The present application claims priority to Korean Patent Application No. 10-2020-0137092 filed on Oct. 21, 2020, the disclosures of which are incorporated herein by reference.

BACKGROUND ART

Recently, with the rapid increase in demand for portable electronic products such as laptop computers, video cameras, and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

This lithium secondary battery mainly uses lithium-based oxide and carbon material as a positive electrode active material and a negative electrode active material, respectively. In addition, this lithium secondary battery includes an electrode assembly in which a positive electrode plate and a negative electrode plate respectively coated with the positive electrode active material and the negative electrode active material are disposed with a separator interposed therebetween, and an exterior, namely a battery case, for hermetically accommodating the electrode assembly together with an electrolyte.

In addition, depending on the shape of the exterior, lithium secondary batteries may be classified into a can-type battery cell in which the electrode assembly is included in a metal can and a pouch-type battery cell in which the electrode assembly is included in a pouch made of an aluminum laminate sheet.

Here, in case of the can-type battery cell, the metal can in which the electrode assembly is included may be made in a cylindrical shape. The can-type battery cell may be used to construct a battery pack that includes a module case for accommodating a plurality of secondary batteries and a bus bar configured to electrically connect the plurality of battery cells.

Meanwhile, the battery pack of the prior art basically measures the temperature change according to the charging and discharging of a plurality of battery cells in order to determine the battery operating state or battery life. The battery pack of the prior art uses a temperature sensor to measure the temperature of the plurality of battery cells. At this time, an adhesive tape is generally used to fix the temperature sensor at a place where temperature measurement is required.

However, the work of directly fixing the temperature sensor with an adhesive tape by hand as in the prior art has become a factor to increase the manufacturing time and manufacturing cost. Moreover, when an adhesive tape is used to fix the temperature sensor, there is a problem in that the position of the temperature sensor is changed depending on the worker.

Therefore, the battery packs of the prior art have a problem in that, even if the battery cell temperature is the same, there is a deviation in temperature values measured through the temperature sensor. Accordingly, it is difficult to manage the life or safety of the battery pack by measuring the temperature of the battery pack.

DISCLOSURE

Technical Problem

The present disclosure is designed to solve the problems of the related art, and therefore the present disclosure is directed to providing a battery pack for securing easy installation of a temperature sensor and enhancing reliability of temperature measurement for a plurality of battery cells.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:

a plurality of battery cells;

a temperature measuring unit configured to measure a temperature of at least one of the plurality of battery cells;

a temperature sensor connected to the temperature measuring unit and configured to detect the temperature of at least one of the plurality of battery cells and transmit an electrical signal to the temperature measuring unit; and a module case including a sidewall portion configured to form an inner space for accommodating the plurality of battery cells, an opening formed in the sidewall portion to expose at least one of the plurality of battery cells to the outside partially, an accommodation portion having an entrance communicating with the opening and configured to accommodate an end of the temperature sensor, and a fixing rib configured to extend from the sidewall portion to cover the entrance partially.

Also, the fixing rib may have a step formed in a portion thereof to have a different protruding length toward the battery cell.

Moreover, the temperature sensor may include:

a wire portion having a wire to transmit an electrical signal; and a thermistor portion configured to change an electrical resistance according to a temperature change of the battery cell and located at an end of the wire portion to have a greater sectional area than the wire portion.

In addition, the fixing rib may have a fixing groove formed concavely in a portion thereof so that the wire portion is partially inserted.

Further, at least one pressing protrusion protruding toward the thermistor portion may be formed in the space of the accommodation portion so that the thermistor portion is in close contact with a portion of the battery cell exposed through the opening.

Also, there may be provided at least two pressing protrusions, and the two or more pressing protrusions may be spaced apart from each other by a predetermined distance and have different protruding lengths.

Moreover, the battery pack may further comprise an adhesive configured to be injected into the space of the accommodation portion.

In addition, the battery pack may further comprise an elastic member provided in the space of the accommodation portion and configured to press the thermistor portion.

Further, in another aspect of the present disclosure, there is also provided an electronic device, comprising at least one battery pack.

Also, in another aspect of the present disclosure, there is also provided a vehicle, comprising at least one battery pack.

Advantageous Effects

According to an embodiment of the present disclosure, since the present disclosure includes a module case having an accommodation portion for accommodating the temperature sensor and a fixing rib configured to cover the entrance of the accommodation portion, after the end of the temperature sensor is accommodated in the space of the accommodation portion, it is possible to effectively prevent the end of the temperature sensor from escaping to the outside again. Accordingly, unlike the prior art where an adhesive tape is used to fix the end of the temperature sensor, the adhesive tape is unnecessary in the present disclosure, and thus there is an advantage of reducing the material cost and shortening the manufacturing process time.

DESCRIPTION OF DRAWINGS

FIG. 4 is a diagram showing an accommodation portion of FIG. 3, viewed at another angle, while excluding a first frame.

FIG. 5 is a sectional view corresponding to FIG. 4 and showing an accommodation portion of a battery pack according to the second embodiment of the present disclosure.

FIG. 6 is a sectional view corresponding to FIG. 4 and showing an accommodation portion of a battery pack according to the third embodiment of the present disclosure.

FIG. 7 is a sectional view corresponding to FIG. 4 and showing an accommodation portion of a battery pack according to the fourth embodiment of the present disclosure.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
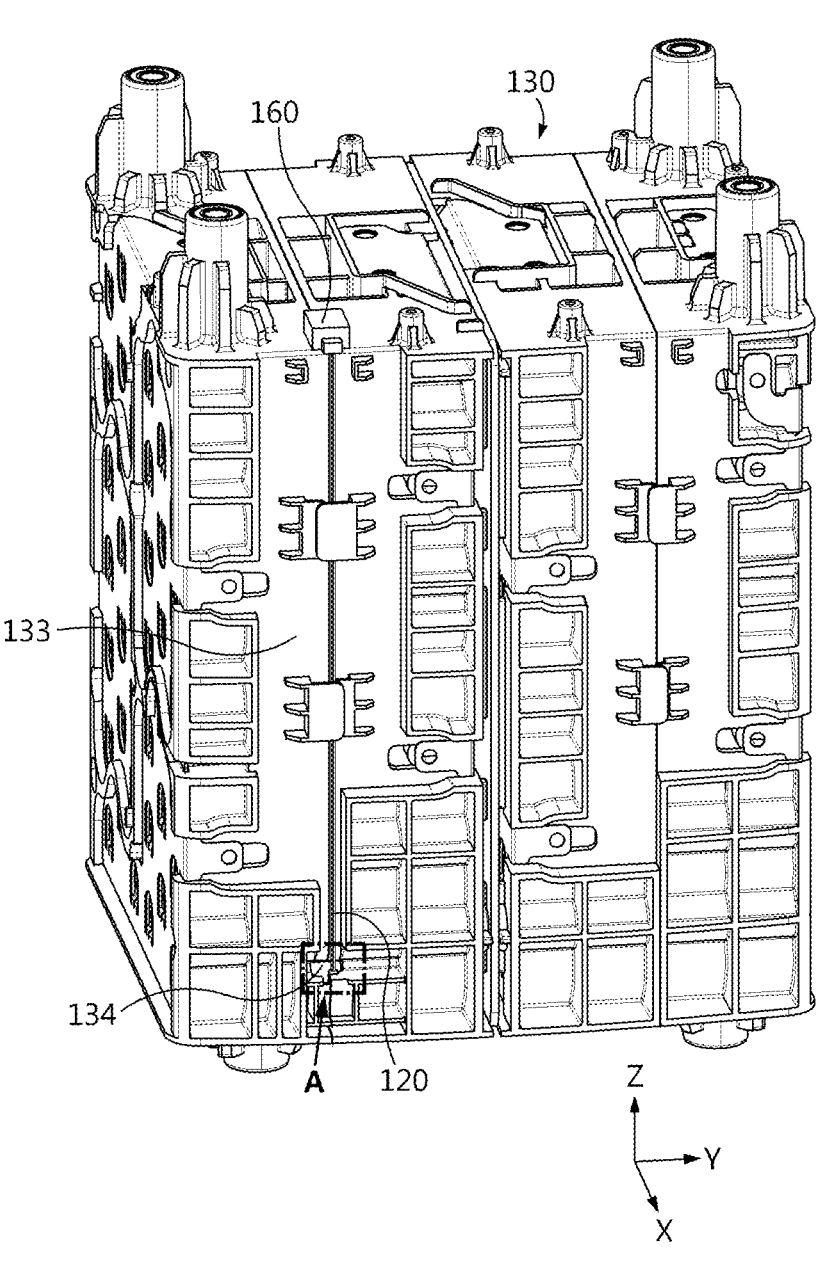
FIG. 1 is a perspective view schematically showing a battery pack according to an embodiment of the present disclosure.
Figure 2:
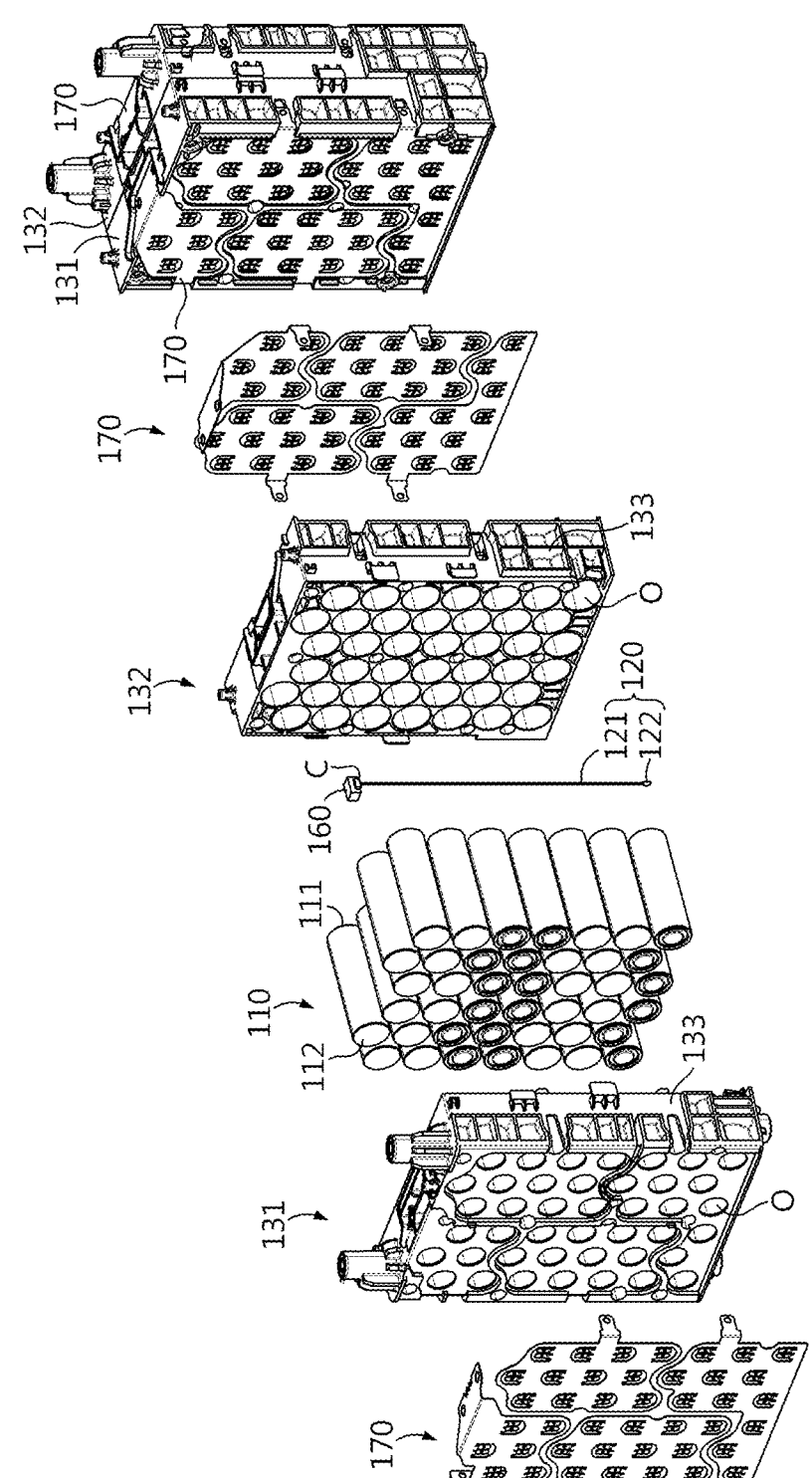
FIG. 2 is an exploded perspective view schematically showing the battery pack according to an embodiment of the present disclosure.
Figure 3:
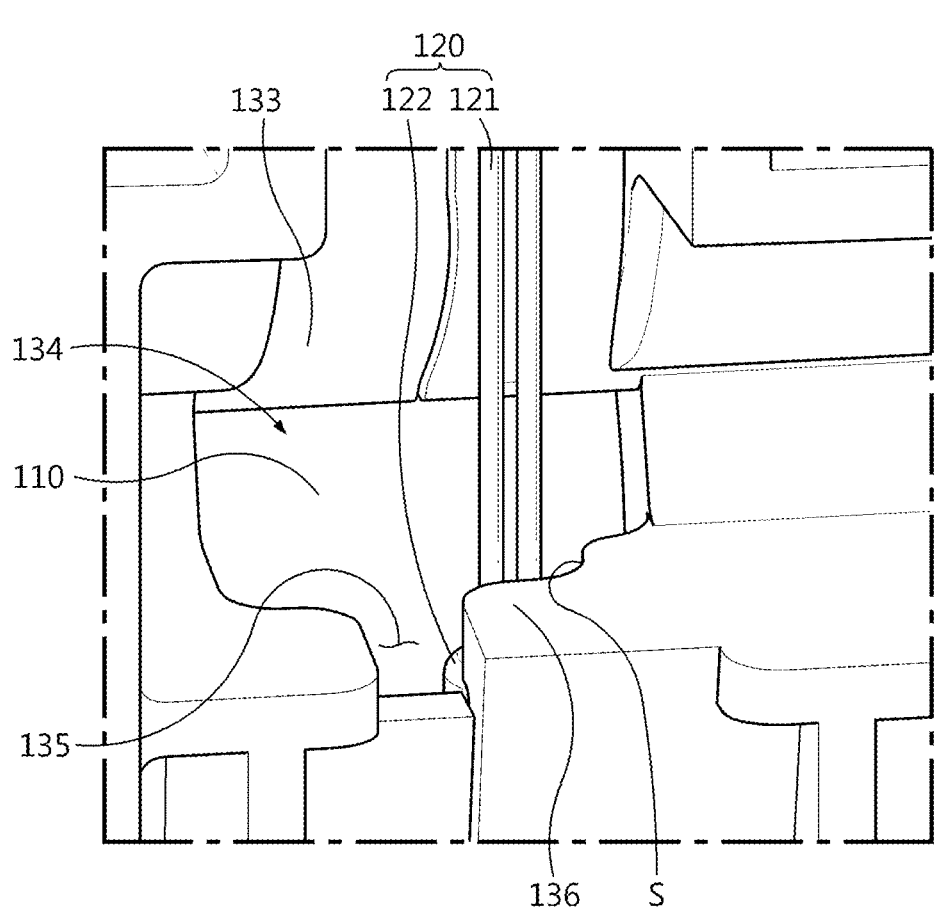
FIG. 3 is an enlarged view showing a portion A of FIG. 1.

FIG. 1 is a perspective view schematically showing a battery pack according to an embodiment of the present disclosure, FIG. 2 is an exploded perspective view schematically showing the battery pack according to an embodiment of the present disclosure, and FIG. 3 is an enlarged view showing a portion A of FIG. 1. For reference, in FIG. 2, a battery pack 100 of the present disclosure includes two assemblies, in each of which a first frame 131 and a second frame 132 are coupled. In FIG. 2 for convenience of description of the drawings, among two assembles, only one assembly located at a relatively front side is illustrated in an exploded form.

Referring to FIG. 1, the battery pack 100 according to an embodiment of the present disclosure includes a plurality of battery cells 110, a temperature measuring unit 160, a temperature sensor 120, and a module case 130.

Specifically, each of the plurality of battery cells 110 may be a rechargeable lithium secondary battery. The battery cell 110 may be a can-type battery cell 110. The battery cell 110 may include a positive electrode terminal 111 and a negative electrode terminal 112 at one end and the other end thereof, respectively. The battery cell 110 may include a cylindrical can.

The configuration of the battery cell 110 is widely known to those skilled in the art at the time of filing of this application and thus will not be described in detail here. In addition, the battery pack 100 according to the present disclosure is not limited to the configuration of the battery cell 110 having a specific shape. That is, various types of battery cells known at the time of filing of this application may be employed in the battery pack 100 according to the present disclosure.

In addition, the battery pack 100 of the present disclosure may further include a plurality of metal plates 170. The metal plate 170 may be configured to electrically connect the plurality of cylindrical battery cells 110. The metal plate 170 may include a conductive metal. The metal plate 170 may include, for example, at least one of copper, nickel, and aluminum.

Moreover, the metal plate 170 may be mounted to a left side or a right side of the module case 130.

In addition, the temperature measuring unit 160 may be configured to detect a temperature of at least one of the plurality of battery cells 110 and transmit an electrical signal to the temperature measuring unit 160. The temperature measuring unit 160 may be configured to calculate the temperature of the battery cell 110 through the electrical signal transmitted from the temperature sensor 120. The temperature measuring unit 160 may include a connector C configured to be connected to the temperature sensor 120.

In addition, the temperature sensor 120 may serve as a sensor that converts heat into an electrical signal. For example, the temperature sensor 120 may include a wire portion 121 and a thermistor portion 122. The wire portion 121 may include a wire to transmit an electrical signal. For example, as shown in FIG. 2, the wire portion 121 may include two wires. The two wires may be wrapped in an electrically insulating sheath.

The thermistor portion 122 may be configured to change an electrical resistance according to a temperature change of the battery cell 110. The thermistor portion 122 may be electrically connected to an end of the wire portion 121. The thermistor portion 122 is located at the end of the wire portion 121 and may have a greater sectional area than the wire portion 121. The thermistor portion 122 may have a cylindrical shape. When a constant current flows in the wire portion 121 and the electrical resistance of the thermistor portion 122 is changed according to the temperature change of the battery cell 110, the temperature measuring unit 160 may calculate the external temperature of the battery cell 110 according to the electrical voltage received from temperature sensor 120.

In addition, the module case 130 may have an electrically insulating material. For example, the module case 130 may adopt polyvinyl chloride as a material. The module case 130 may include a sidewall portion 133. The sidewall portion 133 may be configured to form an inner space that accommodates the plurality of battery cells 110. For example, as shown in FIG. 1, the sidewall portion 133 may have four sides including a front wall, a rear wall, a left wall, and a right wall. In addition, the module case 130 may include an upper wall for covering the upper portion of the plurality of battery cells 110 and a lower wall for covering the lower portion of the plurality of battery cells 110. For reference, the positive direction of the X-axis and the negative direction of the X-axis indicated in FIG. 1 of the present disclosure may refer to a right direction and a left direction. The positive direction of the Y-axis and the negative direction of the Y-axis may refer to a rear direction and a front direction. The positive direction of the Z axis and the negative direction of the Z axis may refer to an upper direction and a lower direction.

Moreover, the module case 130 may have a box-shaped body as a whole. In addition, the module case 130 may have a plurality of hollows O in the body thereof to accommodate the plurality of battery cells 110 therein. For example, the module case 130 may have a plurality of cylindrical hollows O, as shown in FIG. 2.

In addition, the module case 130 may include a first frame 131 and a second frame 132 that form a space for accommodating the plurality of cylindrical battery cells 110. The first frame 131 may be configured to have a rear end coupled to a front end of the second frame 132. In this case, the coupling method may be, for example, bolting.

In addition, an opening 134 may be formed in the sidewall portion 133. The opening 134 may be formed by perforating the sidewall portion 133 partially so that at least one of the plurality of battery cells 110 may be partially exposed to the outside.

The module case 130 may include an accommodation portion 135. The accommodation portion 135 is a space communicating with the opening 134 and serves as an accommodation space in which the thermistor portion 122 of the temperature sensor 120 is accommodated. In other words, the accommodation portion 135 may be a space located inside the module case 130 with respect to the opening 134. The accommodation portion may have an entrance communicating with the opening.

Referring to FIGS. 1 and 3, the accommodation portion 135 may have an entrance at an upper side (+Z-axis direction). For example, the entrance refers to a space above the accommodation portion 135, namely provided in the +Z axis direction with respect to the accommodation portion 135 in FIG. 1, and may be formed by coupling the first frame 131 and the second frame 132 partially.

The module case 130 may include a fixing rib 136. The fixing rib 136 may be configured to cover the entrance partially. The fixing rib 136 may be configured to prevent the thermistor portion 122 of the temperature sensor 120 inserted into the accommodation portion 135 from escaping to the outside of the accommodation portion 135. The fixing rib 136 may be a portion extending from the sidewall. The fixing rib 136 may be configured to cover one side (rear side) or the other side (front side), or both one side and the other side, with respect to the center of the entrance of the accommodation portion 135. The fixing rib 136 may be provided to the second frame 132.

According to this configuration of the present disclosure, since the present disclosure includes the module case 130 having the accommodation portion 135 configured to accommodate the temperature sensor 120 and the fixing rib 136 configured to cover the entrance of the accommodation portion 135, after the end of the temperature sensor 120 is inserted into the space of the accommodation portion 135, it is possible to effectively prevent the end of the temperature sensor 120 from escaping to the outside in the +Z-axis direction again. Accordingly, unlike the prior art where an adhesive tape is used to fix the end of the temperature sensor 120, the adhesive tape is unnecessary, and thus there is an advantage of reducing the material cost and shortening the manufacturing process time.

Figure 4:
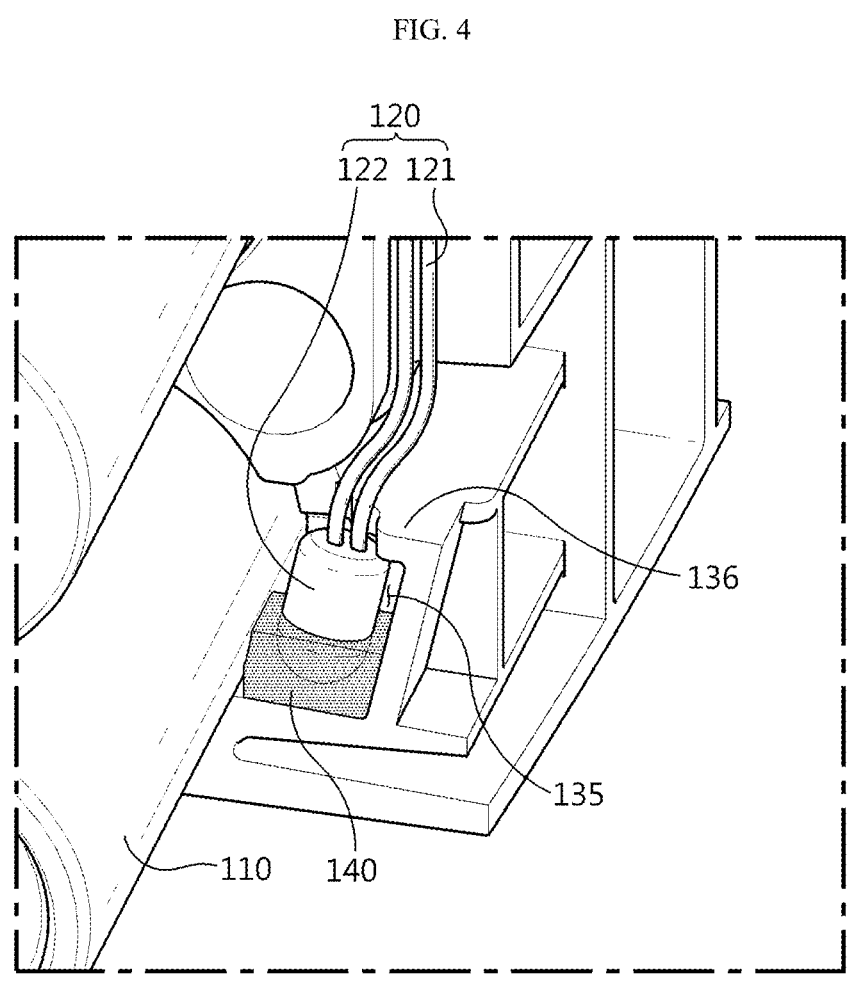

FIG. 4 is a diagram showing the accommodation portion of FIG. 3, viewed at another angle, while excluding the first frame.

Referring to FIG. 4 along with FIG. 3, the fixing rib 136 may have a step S formed in a portion thereof and having a different protruding length toward the battery cell 110. The fixing rib 136 may be located at one side of the entrance of the accommodation portion 135. The fixing rib 136 may be formed so that its length protruding toward the battery cell 110 becomes greater as being closer to a side (rear side) of the entrance of the accommodation portion 135. That is, the step S refers to a portion where the length of the fixing rib 136 protruding toward the battery cell 110 is changed step by step.

In addition, the end of the temperature sensor 120 may be configured to be positioned at the step S of the fixing rib 136. That is, the wire portion 121 of the temperature sensor 120 may be configured to be positioned at a portion where the length of the fixing rib 136 protruding toward the battery cell 110 is relatively long.

Moreover, the end of the temperature sensor 120 may move toward the step of the fixing rib 136 after passing through the central portion of the entrance. That is, after the thermistor portion 122 of the temperature sensor 120 is inserted into the space of the accommodation portion 135, the thermistor portion 122 may move to the lower portion of the fixing rib 136. Accordingly, upward movement of the thermistor portion 122 may be restricted by the step of the fixing rib 136.

Therefore, according to this configuration of the present disclosure, since the step S configured with a different protruding length toward the battery cell 110 is formed in a portion of the fixing rib 136, the end of the temperature sensor 120 may be supported toward the battery cell 110 by the end of the fixing rib 136. Thus, the end of the temperature sensor 120 may be positioned closer to the battery cell 110, or may be in close contact with the outer surface of the battery cell 110. Accordingly, the present disclosure has an advantage of more quickly and accurately measuring the temperature of the battery cell 110 through the temperature sensor 120.

Meanwhile, referring to FIG. 4 again, the present disclosure may further include an adhesive 140 configured to be injected into the space of the accommodation portion 135. The adhesive 140 may be an adhesive 140 that is injected into the inner space of the accommodation portion 135 and then solidified. The adhesive 140 may have transparency and electrical insulation. The adhesive 140 may be a glue or a hot-melt resin. For example, the adhesive 140 may include at least one of a polyamide-based resin, a polyimide-based resin, an epoxy-based resin, and an acrylic resin.

For example, as shown in FIG. 4, the adhesive 140 may be configured to fix a position of the thermistor portion 122 of the temperature sensor 120. That is, the adhesive 140 may fix the end of the temperature sensor 120.

Figure 5:
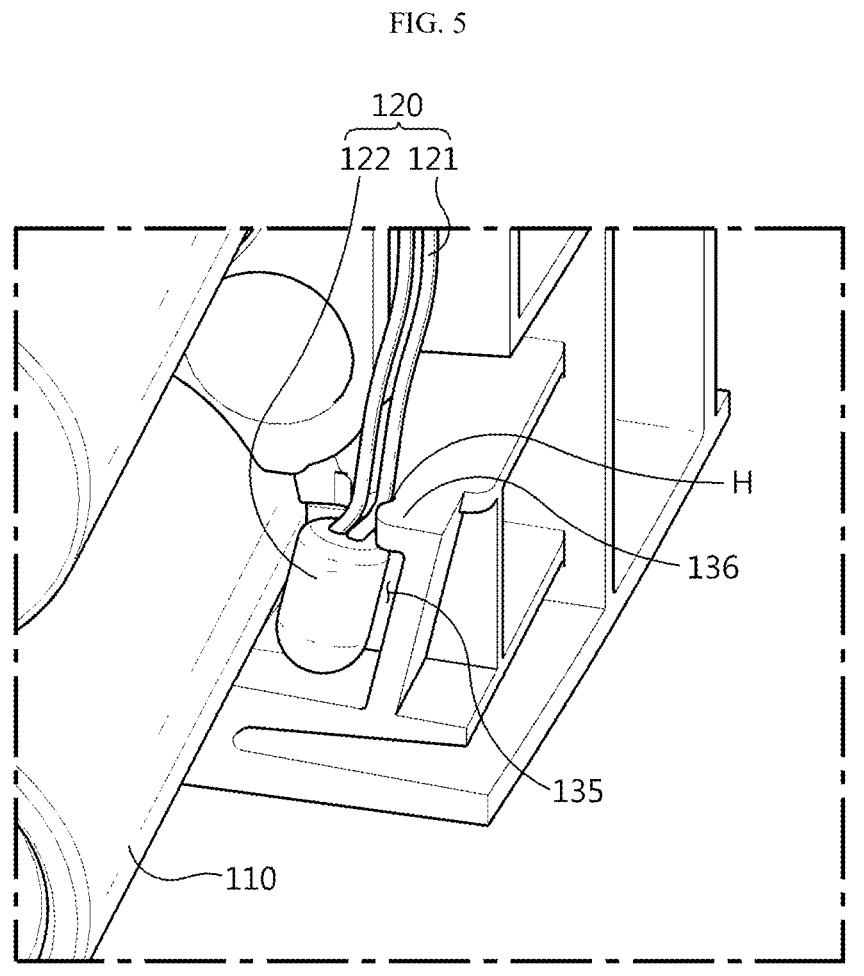

FIG. 5 is a sectional view corresponding to FIG. 4 and showing an accommodation portion of a battery pack according to the second embodiment of the present disclosure.

Referring to FIG. 5, in the battery pack 100 according to the second embodiment of the present disclosure, a fixing groove H may be further formed in the fixing rib 136, unlike the fixing rib 136 of FIG. 3. The fixing groove H may be formed concavely in a portion of the fixing rib 136. That is, the fixing groove H may be formed to be concave into the body from the end of the fixing rib 136. The fixing groove H may be configured so that the wire portion 121 of the temperature sensor 120 is partially inserted.

Therefore, according to this configuration of the present disclosure, since the fixing groove H configured to insert the wire portion 121 partially therein is formed in a portion of the fixing rib 136, the wire portion 121 of the temperature sensor 120 may be stably fixed to the fixing groove H, and the deviation of separated distances from the battery cells 110 may be effectively reduced. That is, in the present disclosure, since the thermistor portion 122 of the temperature sensor 120 may be stably fixed and its position may be constantly maintained by means of the fixing groove H, when the positions of the ends of the temperature sensors 120 are different for various manufactured battery packs 100, it is possible to solve the conventional problem that the reliability of the temperature measured from the temperature measuring unit 160 is lowered.

Figure 6:
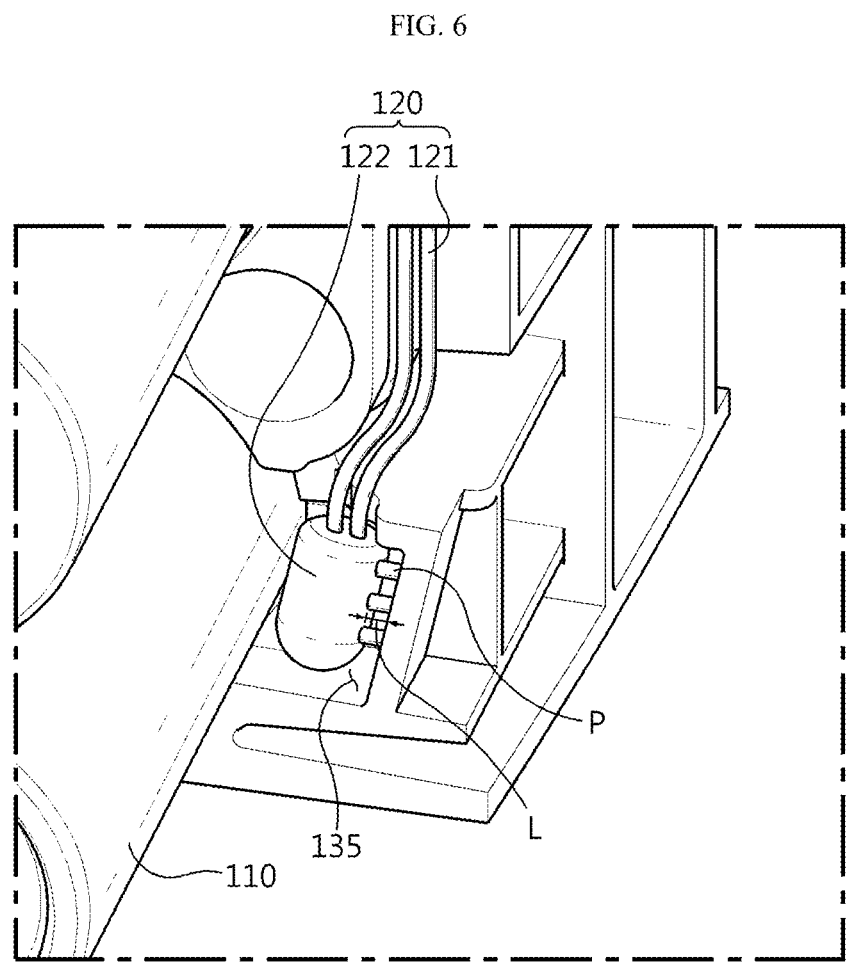

FIG. 6 is a sectional view corresponding to FIG. 4 and showing an accommodation portion of a battery pack according to the third embodiment of the present disclosure.

Referring to FIG. 6, in the battery pack 100 according to the third embodiment of the present disclosure, at least one pressing protrusion P may be provided in the space of the accommodation portion 135. The pressing protrusion P may protrude from the inner surface of the inner space of the accommodation portion 135 so that the thermistor portion 122 is in close contact with a portion of the battery cell 110 exposed through the opening 134. The pressing protrusion P may have a shape protruding toward the thermistor portion 122. For example, as shown in FIG. 6, three pressing protrusions P may be configured to protrude from the inner surface of the accommodation portion 135 toward the thermistor portion 122, so that the thermistor portion 122 is in close contact with the battery cell 110.

Therefore, according to this configuration of the present disclosure, since at least one pressing protrusion P is provided in the space of the accommodation portion 135, the thermistor portion 122 of the temperature sensor 120 may be supported toward the battery cell 110 by the pressing protrusion P. Thus, the thermistor portion 122 of the temperature sensor 120 may be located closer to the battery cell 110, or may be in close contact with the outer surface of the battery cell 110. Accordingly, the present disclosure has an advantage of more quickly and accurately measuring the temperature of the battery cell 110 through the temperature sensor 120.

Meanwhile, referring to FIG. 6 again, at least two pressing protrusions P may be provided. For example, as shown in FIG. 6, three pressing protrusions P may be formed on the inner surface of the accommodation portion 135. In addition, the two or more pressing protrusions P may be spaced apart from each other by a predetermined distance and may have different protruding lengths L toward the thermistor portion 122 of the temperature sensor 120. For example, as shown in FIG. 6, among the three the pressing protrusions P, a pressing protrusion P located at a lower side may have a greater protruding length L toward the thermistor portion 122 than a pressing protrusion P located at an upper side. Accordingly, the lower part of the thermistor portion 122 may be located relatively closer to the battery cell 110 than the upper part thereof.

Therefore, according to this configuration of the present disclosure, since the present disclosure includes at least two or more pressing protrusions P having different protruding lengths L, it is possible to help the thermistor of the temperature sensor 120 to be positioned corresponding to the outer surface of the battery cell 110. That is, since the two or more pressing protrusions P may adjust the received position of the thermistor portion 122 of the temperature sensor 120, the thermistor portion 122 may maintain a constant distance from the outer surface of the battery cell 110, or its area in close contact with the outer surface of the battery cell 110 may be increased little more.

Figure 7:
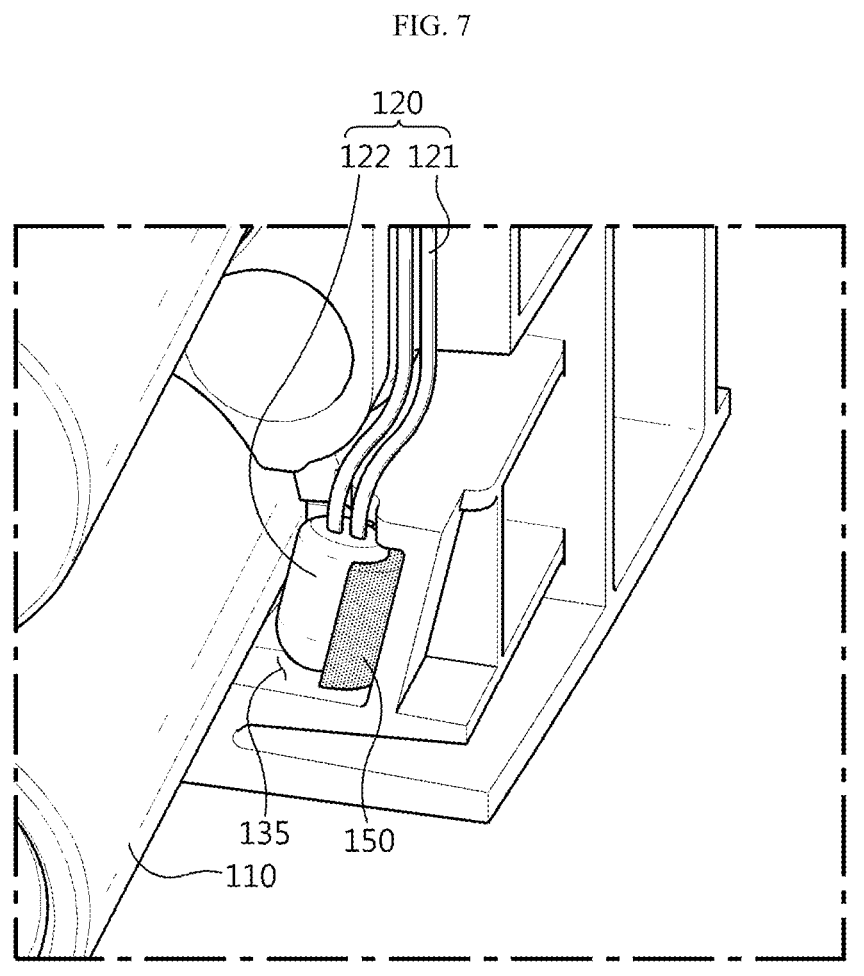

FIG. 7 is a sectional view corresponding to FIG. 4 and showing an accommodation portion of a battery pack according to the fourth embodiment of the present disclosure.

Referring to FIG. 7, the battery pack 100 according to the fourth embodiment of the present disclosure may further include an elastic member 150, when compared with the battery pack 100 of FIG. 4. The elastic member 150, for example, may include a material having elastic deformation, or elastic restoring force. The material may be, for example, any one or more of silicone, urethane, rubber, and sponge.

In addition, the elastic member 150 may be accommodated in advance in the space of the accommodation portion 135 before the end of the temperature sensor 120 is inserted. The elastic member 150 may be configured to press the thermistor portion 122. That is, when the thermistor portion 122 of the temperature sensor 120 enters the accommodation portion 135, the volume of the elastic member 150 may be reduced due to elastic deformation, and when the insertion process of the thermistor portion 122 ends, the volume of the elastic member 150 may be expanded again by the elastic force, and the thermistor portion 122 of the temperature sensor 120 may be pressed to be in close contact with the outer surface of the battery cell 110 by the elastic force of the elastic member 150.

Therefore, according to this configuration of the present disclosure, since the present disclosure includes the elastic member 150 configured to press the thermistor portion 122, the thermistor portion 122 of the temperature sensor 120 may be located closer to the battery cell 110 or may be in close contact with the outer surface of the battery cell 110. Accordingly, the present disclosure has an advantage of more quickly and accurately measuring the temperature of the battery cell 110 through the temperature sensor 120.

Meanwhile, the battery pack 100 according to an embodiment of the present disclosure further includes various devices (not shown) for controlling the charging and discharging of the battery pack 100, for example, a BMS (Battery Management System), a current sensor, and a fuse.

Meanwhile, an electronic device (not shown) according to an embodiment of the present disclosure includes at least one battery packs 100 described above. The electronic device may further include a device housing (not shown) having an accommodation space for accommodating the battery pack 100 and a display unit through which a user may check the state of charge of the battery pack 100.

In addition, the battery pack 100 according to an embodiment of the present disclosure may be included in a vehicle such as an electric vehicle or a hybrid electric vehicle. That is, the vehicle according to an embodiment of the present disclosure may include at least one battery pack 100 described above. The battery pack 100 may be mounted in a vehicle body of the vehicle.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

Heretofore, embodiments and experimental examples has been described in detail to describe the present disclosure more specifically, but the present disclosure is not limited by these embodiments and experimental examples. The embodiments according to the present disclosure may be modified in various other forms, and the scope of the present disclosure should not be construed as being limited to the embodiments described above. The embodiments of the present disclosure are provided to more fully explain the present disclosure to those skilled in the art.

What is claimed is:

1. A battery pack, comprising:
a plurality of battery cells;
a temperature measuring unit configured to measure a temperature of at least one of the plurality of battery cells;
a temperature sensor connected to the temperature measuring unit and configured to detect the temperature of at least one of the plurality of battery cells and transmit an electrical signal to the temperature measuring unit; and
a module case including:
a sidewall portion configured to form an inner space for accommodating the plurality of battery cells, an opening formed in the sidewall portion to partially expose at least one of the plurality of battery cells to an outside;
an accommodation portion having an entrance communicating with the opening and configured to accommodate a first end of the temperature sensor; and
a fixing rib configured to extend from the sidewall portion to partially cover the entrance,
wherein:
the entrance extends at least along a first direction;
the first end of the temperature sensor is inserted into the accommodation portion using the entrance;
at least a portion of the temperature sensor is not inserted into the accommodation portion, the at least a portion extends along the first direction, and the at least a portion is closer to the first end than to a second end of the temperature sensor;

the entrance extends and is oriented at least along the first direction and along a second direction perpendicular to the first direction; and
the entrance is continuous from the first direction to the second direction.

2. The battery pack according to claim 1,
wherein the fixing rib has a step formed in a portion of the fixing rib to have a different protruding length toward the at least one of the plurality of battery cells.

3. The battery pack according to claim 1,
wherein the temperature sensor includes:
a wire portion having a wire to transmit an electrical signal; and
a thermistor portion configured to change an electrical resistance according to a temperature change of the at least one of the plurality of battery cells and located at an end of the wire portion to have a greater sectional area than the wire portion.

4. The battery pack according to claim 3,
wherein the fixing rib has a fixing groove formed concavely in a portion of the fixing rib so that the wire portion is partially inserted.

5. The battery pack according to claim 3,
wherein at least one pressing protrusion protruding toward the thermistor portion is formed in a space of the accommodation portion so that the thermistor portion is in close contact with a portion of the at least one of the plurality of battery cells exposed through the opening.

6. The battery pack according to claim 5,
wherein there are provided two or more pressing protrusions, and
the two or more pressing protrusions are spaced apart from each other by a predetermined distance and have different protruding lengths.

7. The battery pack according to claim 1, further comprising:
an adhesive configured to be injected into a space of the accommodation portion.

8. The battery pack according to claim 3, further comprising:
an elastic member provided in a space of the accommodation portion and configured to press the thermistor portion.

9. An electronic device, comprising the battery pack according to claim 1.

10. A vehicle, comprising the battery pack according to claim 1.

11. A battery pack, comprising:
a plurality of battery cells;
a temperature measuring unit configured to measure a temperature of at least one of the plurality of battery cells;
a temperature sensor connected to the temperature measuring unit and configured to detect the temperature of at least one of the plurality of battery cells and transmit an electrical signal to the temperature measuring unit; and
a module case including:
a sidewall portion configured to form an inner space for accommodating the plurality of battery cells, an opening formed in the sidewall portion to partially expose at least one of the plurality of battery cells to an outside;
an accommodation portion having an entrance communicating with the opening and configured to accommodate a first end of the temperature sensor; and a fixing rib configured to extend from the sidewall portion to partially cover the entrance, wherein:

the entrance extends at least along a first direction;

the first end of the temperature sensor is inserted into the accommodation portion using the entrance;

at least a portion of the temperature sensor is not inserted into the accommodation portion, the at least a portion extends along the first direction, and the at least a portion is closer to the first end than to a second end of the temperature sensor;

the fixing rib has a step formed in a portion of the fixing rib to have a different protruding length toward the at least one of the plurality of battery cells; and the step protrudes toward the at least one of the plurality of battery cells along a second direction that is perpendicular to the first direction.

* * * * *